United States Patent
Phelps

(10) Patent No.: US 7,519,552 B2
(45) Date of Patent: Apr. 14, 2009

(54) METHOD OF ENHANCING VALUE OF PENSION SYSTEM ASSETS

(75) Inventor: Robert B. Phelps, New Orleans, LA (US)

(73) Assignee: Indianola Development Company, L.L.C., Raton Rouge, LA (US)

(*) Notice: Subject to any disclaimer, the term of this patent is extended or adjusted under 35 U.S.C. 154(b) by 685 days.

(21) Appl. No.: 11/051,473

(22) Filed: Feb. 7, 2005

(65) Prior Publication Data

US 2005/0187801 A1 Aug. 25, 2005

Related U.S. Application Data

(63) Continuation-in-part of application No. 10/636,125, filed on Aug. 7, 2003.

(51) Int. Cl.
*G06Q 40/00* (2006.01)

(52) U.S. Cl. .................. 705/35; 705/36 R; 705/39

(58) Field of Classification Search .................. 705/4, 705/35, 36 R, 36 T; 708/130, 131, 132, 34; 434/107, 109, 433
See application file for complete search history.

(56) References Cited

U.S. PATENT DOCUMENTS

| | | | |
|---|---|---|---|
| 4,969,094 A | 11/1990 | Halley et al. |
| 5,136,502 A | 8/1992 | Van Remartel et al. |
| 5,802,500 A | 9/1998 | Ryan et al. |
| 5,907,828 A | 5/1999 | Meyer et al. |
| 5,974,390 A | 10/1999 | Ross |
| 5,991,744 A | 11/1999 | DiCresce |
| 6,456,979 B1 | 9/2002 | Flagg |
| 6,473,737 B2 | 10/2002 | Burke |
| 2002/0035489 A1 | 3/2002 | Herman et al. |

(Continued)

OTHER PUBLICATIONS

Cashing Out by Ron Panko. Best's Review. Oldwick: Apr. 2002. vol. 102, Iss. 12; p. 92, 4 pgs.*

(Continued)

*Primary Examiner*—Mary Cheung
*Assistant Examiner*—Brian Fertig
(74) *Attorney, Agent, or Firm*—Foley & Lardner LLP

(57) ABSTRACT

A program product, a system, and method for a trustee and a pension system, one embodiment of a program product consistent with the invention comprises program code for generating or receiving a plurality of files or a reference or references to a plurality of files that form an life insurance settlement pool, wherein the insureds in the pool are not beneficiaries of that pension system; program code for issuing payment instructions and/or payment instruments to maintain each of a plurality of the life insurance settlement contracts; program code for registering in an electronic database an ownership interest for the pension system in the life insurance settlement pool and/or in each insurance settlement contract in the life insurance settlement pool; program code for electronically determining or having determined a proportionate share of the life insurance settlement pool; program code for paying out or having paid out proceeds from the insurance policies in accordance with a predetermined priority of distribution; program code for electronically generating or having generated an actuarial value of the life insurance settlement pool or an undivided interest therefore or an undivided interest in each of the life insurance settlement contracts in the pool on a periodic or other basis; and program code for communicating the actuarial value to at least one pension system that owns an undivided interest in the life insurance settlement pool.

49 Claims, 6 Drawing Sheets

U.S. PATENT DOCUMENTS

| | | |
|---|---|---|
| 2002/0198802 A1 | 12/2002 | Koresko |
| 2003/0018498 A1 | 1/2003 | Banks |
| 2004/0064391 A1* | 4/2004 | Lange .................. 705/36 |
| 2005/0216316 A1 | 9/2005 | Brisbois et al. |
| 2006/0080148 A1 | 4/2006 | Koresko |

OTHER PUBLICATIONS

Author Unknown, "Measuring Pension Obligations and Determining Pension Plan Costs," Actuarial Standards Board—Exposure Draft, Dec. 2002, 23 pages.

Brooks, Brian, et al., "Clients May Hold Millions in Untapped Insurance Wealth, Study Finds," Street Talk, On Wall Street, Nov. 2002, 23-24 pages.

Buerger, Alan H., "Life Settlements Come of Age," Trusts & Estates, Nov. 2002, 4 pages.

Connolly, Jim, "Life Settlement Proposals Could Affect Viatical Brokers and Contracts," National Underwriting, Sep. 2003, 10 pages.

De Simone, Marcella, "Life Settlement Association Seeks To Set Up Accountability Standards," National Underwriter, Sep. 2003, 8 and 10 pages.

Doherty, Neil A., et al., "The Benefits of A Secondary Market For Life Insurance Policies," publication date unknown, (received from applicant post filing), 27 pages.

Doherty, Neil A., et al., "The Benefits of A Secondary Market For Life Insurance Policies," Real Property, Probate and Trust Journal, vol. 38, No. 3, 2003, 449-478 pages.

Fullerton, Jolene D., "Using Life Settlements to Achieve Charitable Giving Goals," National Underwriter, Sep. 2003, 5-6 pages.

Higgins, Barry, "Agents Find Opportunities in Life Settlements," National Underwriter, Sep. 2003, 4-5 pages.

Katt, Peter, "A Life Settlement Update: And Life Insurance in Pension Plans," AAII Journal, May 2003, vol. XXV, No. 4, 33-35 pages.

Panko, Ron, "Cashing Out," Life Settlements, Life/Health, Bests Review, Apr. 2002, 4 pages.

Savage, Terence, "Life Settlements Require A Complete Underwriting Workup," National Underwriter, Life & Health/Financial Services Edition, Oct. 2002, 2 pages.

* cited by examiner

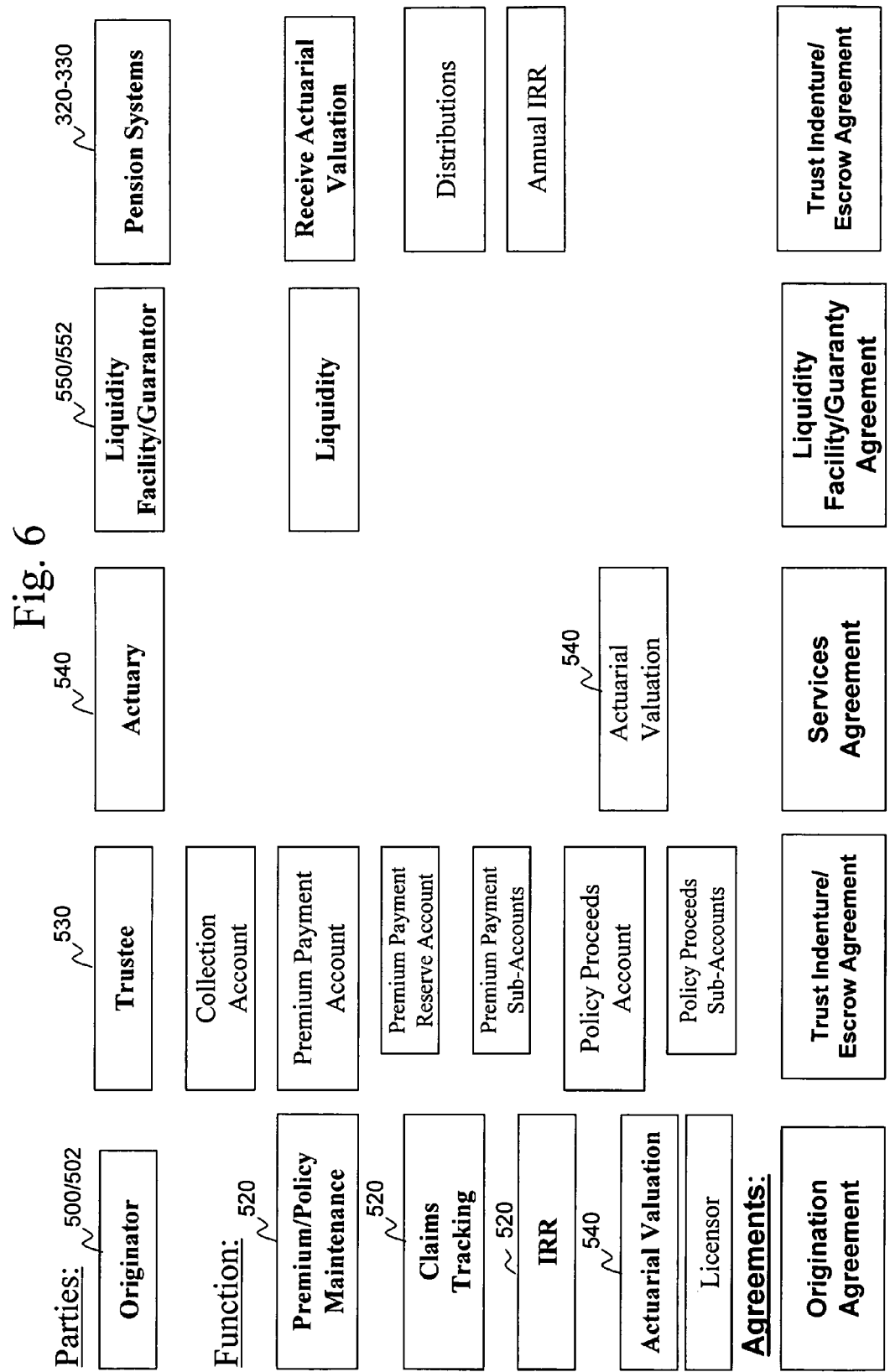

METHOD OF ENHANCING VALUE OF PENSION SYSTEM ASSETS

CROSS-REFERENCE TO RELATED PATENT APPLICATIONS

This application is a Continuation in part of U.S. application Ser. No. 10/636,125, filed Aug. 7, 2003, incorporated herein by reference in its entirety.

TECHNICAL FIELD

The present invention pertains to pension systems and methods of finding them.

THE INVENTION

Assets included in one or more specific pension systems administered by pension systems (i.e., the administrative apparatus which controls and manages one or more pension systems) vary by law and policy, but include generally fixed income securities and equities (as individual securities or shares in pools of securities, e.g., mutual funds), cash or cash equivalents, and other permitted investments, e.g., real estate, annuity contracts, life insurance policies and other classes of investments. Note that the term "pension system" is defined broadly as including all retirement benefit systems. Valuing the assets included in such retirement systems requires utilization of various methods which depend in whole or in part upon the characteristics of the asset being valued. Valuation methods for securities traded in liquid markets are based on public data. Illiquid securities require independent analysis, e.g., appraisals for real estate. The valuation of assets administered by a pension system (public or private) is further determined by a number of rules-based constraints, such as, e.g., generally accepted accounting treatment (including governmental accounting standards), ERISA under U.S. law, and generally accepted actuarial treatment.

A periodic actuarial task undertaken by all pension systems is an analysis of the status of the system's pension system(s) as of a point in time which includes an evaluation of two independent components: a) liabilities and b) assets and further includes a calculation of the magnitude of the difference between the assets and liabilities. If liabilities exceed assets, the pension system has an unfunded actuarial accrued liability ("UAL"). The UAL is one measure of fiscal health, and it measures the difference on a given day between the actuarial asset value and the actuarial accrued liabilities of a given system. Generally, a pension system should determine annually a) its normal costs to meet the expected costs of funding future liabilities on a current basis and b) amortize its UAL to make up for the mismatch between assets and liabilities (the "UAL Amortization"). Generally, actuarial value of the liabilities of a system are determined using generally accepted actuarial treatment of the life expectancy of the pool of beneficiaries and the respective benefits due beneficiary classes from the pension system. Generally, actuarial value of assets can be valued on the basis of (a) book, (b) market or (c) some other actuarially sound method, including a modification involving either or both. For example, equity assets of a system are commonly valued at both market value and at actuarial value, which allocates realized and unrealized gains over a smoothing period over two or more years. Actuarial present value analysis also is employed as part of the actuarial asset valuation process. Actuarial present value is the value as of a specific date of an amount or series of amounts payable or receivable thereafter, with each amount adjusted to reflect the time value of money and the probability of payments.

Conventionally, pension system managers wishing to redeploy assets to increase return were limited to traditional vehicles (e.g., equities and fixed income securities) and their traditional methods of valuation (e.g., book or market) with the attendant market and timing risks. It has been the case that life insurance settlement contracts providing death benefits on the life of beneficiaries of a pension system have been used to a limited extent in some pension systems and exclusively in other systems (e.g., 412(i) systems in the United States) primarily for beneficial income tax treatment, e.g., under the U.S. Internal Revenue Code, of premiums paid, since some portion of contributions to a pension system used to pay policy premiums are deductible by the payor at least in the United States. However, estate tax and other consequences can make the use of life insurance settlement contracts by a pension system on pension system beneficiaries unattractive.

A secondary market in current life insurance policies has developed in the past decade based on evolving legal environment and market requirements. First employed in the viatical arena to enable terminally ill insureds to obtain a portion of the value of their death benefit coverage during life, the sale and purchase of such life insurance settlement contracts (also known as "viatical settlements") in the secondary market has grown steadily. Viatical settlements are regulated in a number of states in the United States. A secondary market also exists for current life insurance settlement contracts on well insureds, which are described as "life settlement" contracts, to distinguish from viatical settlements.

SUMMARY OF THE INVENTION

The inventor has recognized that pension systems continue to suffer significant fluctuations in value and in fact are increasingly determined to be under-funded during periods of declining market values and stable or rising benefit liabilities despite the evolution of financial products and that there exists a significant need for a way to remove some measure of volatility in the actuarially determined status of pension systems by increasing the value of system assets.

The present invention in one embodiment, satisfies this need in a unique and highly facile way by providing, amongst other things, a method which comprises investing at least a portion of one or more assets of a pension system so as to acquire an interest in one or more current, in-force life insurance settlement contracts from one or more owners of the one or more current, in-force life insurance settlement contracts, wherein each of the one or more life insurance settlement contracts is characterized in that it either (a) provides a plurality of periodic payments during the life of an insured or (b) provides a single death benefit on the life of an insured, but in either case, the insured is not a beneficiary of the pension system. This particular use of an insurance settlement contract having as the insured someone who is not a beneficiary of the pension system is believed to be quite unique. The insurance settlement contract(s) employed in this invention will always have the characteristic of providing to a beneficiary (1) a stream of payments, (2) a death benefit, or (3) both 1 and 2, with the payment obligations to the beneficiary being either terminated or triggered by the death of an insured. The remaining life expectancy of the insured or the remaining life expectancy of each of the insureds, when determined at least immediately after the acquisition, is such that (i) the total value of the pension system assets, inclusive of the interest so acquired, determined immediately after the acquisition, is appreciably greater than (ii) the total value of the pension system assets, exclusive of the interest so acquired and inclusive of the at least a portion of one or more assets of the pension system invested, the respective total values of (i) and (ii) being determined at the same point in time and in accordance with the same actuarially sound valuation method.

In another embodiment of this invention, the remaining life expectancy of the insured or the remaining life expectancy of each of the insureds, when determined at any time after the acquisition but prior to the occurrence of death of the insured or of any one of the insureds, as applicable, is such that (i) the total value of the pension system assets, inclusive of the interest so acquired, determined immediately after the acquisition, is appreciably greater than (ii) the total value of the pension system assets, exclusive of the interest so acquired and inclusive of the at least a portion of one or more assets of the pension system invested, the respective total values of (i) and (ii) being determined at the same point in time and in accordance with the same actuarially sound valuation method. As used in this description and the appended claims, the phrase "actuarially sound valuation method" is intended to mean any method for valuing an asset, which method is in accordance with the standards of the Actuarial Standards Board in existence as of the filing of this disclosure.

Another embodiment of this invention provides a pension system comprised of an investment portfolio, wherein the investment portfolio is comprised of an interest in one or more current, in-force life insurance settlement contracts, wherein each of the one or more life insurance settlement contracts is characterized in that it either (a) provides a plurality of periodic payments during the life of an insured or (b) provides a single death benefit on the life of an insured, but in either case, the insured is not a beneficiary of the pension system.

Yet another embodiment of the present invention provides an investment product marketable to a pension system having pension system assets to invest. The investment product comprises a transferable interest in a pool of current, in-force life insurance settlement contracts, wherein each of the one or more life insurance settlement contracts is characterized in that it either (a) provides a plurality of periodic payments during the life of an insured or (b) provides a single death benefit on the life of an insured, but in either case, the insured is not a beneficiary of the pension system.

A further embodiment of the present invention comprises a program product for operating as a trustee of assets for a pension system, comprising: a set of computer readable media, wherein set means at least one, having computer readable program code to be executed by a computer embodied among them, the computer readable program code comprising program code for generating or receiving a plurality of files or a reference or references to a plurality of files that form an life insurance settlement pool, wherein each file includes information on a life insurance settlement contract that either (a) provides a plurality of periodic payments during the life of an insured or (b) provides a single death benefit on the life of an insured, but in either case, the insured is not a beneficiary of the pension system, and wherein each file includes information on an insurance settlement contract that meets at least one predetermined criterion; program code for issuing payment instructions and/or payment instruments to maintain each of a plurality of the life insurance settlement contracts in the life insurance settlement pool in effect; program code for registering in an electronic database an ownership interest for the pension system in the life insurance settlement pool and/or in each insurance settlement contract in the life insurance settlement pool; program code for electronically determining or having determined a proportionate share of the life insurance settlement pool based on an amount of value provided by the pension system for its investment and on total assets in the life insurance settlement pool at the time of purchase; program code for paying out or having paid out proceeds from the insurance policies in accordance with a predetermined priority of distribution; program code for electronically generating or having generated an actuarial value of the life insurance settlement pool or an actuarial value for the undivided interest held by the pension system in the life insurance settlement pool, and/or an actuarial value of an undivided interest held by the pension system in each of the life insurance settlement contracts in the life insurance settlement pool on a periodic or other basis; and program code for communicating the actuarial value of the life insurance settlement pool or the actuarial value for the undivided interest held by the pension system in the life insurance settlement pool and/or the actuarial value of an undivided interest held by the pension system in each of the life insurance settlement contracts in the life insurance settlement pool to at least one pension system that owns an undivided interest in the life insurance settlement pool.

In a further embodiment of the present invention a program product is provided comprising: a set of computer readable media, wherein set means at least one, having computer readable program code to be executed by a computer embodied among them, the computer readable program code comprising program code for a pension system investing one or more pension system assets to obtain an undivided interest in an life insurance settlement pool that comprises a plurality of life insurance settlement contracts, wherein each insurance settlement contract either (a) provides a plurality of periodic payments during the life of an insured or (b) provides a single death benefit on the life of an insured, but in either case, the insured is not a beneficiary of the pension system, and wherein each insurance settlement contract meets at least one predetermined criterion; program code for receiving registration information that references the life insurance settlement pool and/or each insurance settlement contract in the life insurance settlement pool; program code for receiving an actuarial value of the life insurance settlement pool, or an actuarial value of an undivided interest held by the pension system in the life insurance settlement pool, or an actuarial value of an undivided interest held by the pension system in each of the life insurance settlement contracts in the life insurance settlement pool, on a periodic or other basis; program code for calculating or having calculated electronically a UAL (unfunded actuarial accrued liability) based in part on the actuarial value of the life insurance settlement pool, or the actuarial value of the undivided interest held by the pension system in the life insurance settlement pool, or the sum of the actuarial values of the undivided interests held by the pension system in the life insurance settlement contracts in the life insurance settlement pool; program code for calculating or having calculated electronically a UAL amortization based at least in part on the UAL; and program code for communicating or having communicated a report or a network reference to the report to a third party that includes data based at least in part on the UAL amortization.

In a further embodiment of the present invention a system is provided for operating as a trustee of assets for a pension system, comprising: a component for generating or receiving a plurality of files or a reference or references to a plurality of files that form an life insurance settlement pool, wherein each file includes information on a life insurance settlement contract that either (a) provides a plurality of periodic payments during the life of an insured or (b) provides a single death benefit on the life of an insured, but in either case, the insured is not a beneficiary of the pension system, and wherein each file includes information on an insurance settlement contract that meets at least one predetermined criterion; a component for issuing payment instructions and/or payment instruments to maintain each of a plurality of the life insurance settlement contracts in the life insurance settlement pool in effect; a component for registering in an electronic database an ownership interest for the pension system in the life insurance settlement pool and/or in each insurance settlement contract in the life insurance settlement pool; a component for electronically determining or having determined a proportionate share of the life insurance settlement pool based on an amount of value provided by the pension system for its investment and on total assets in the life insurance settlement pool at the time of purchase; a component for paying out or having paid out proceeds from the insurance policies in accordance with a predetermined priority of distribution; a component for electronically generating or having generated an actuarial value of the life insurance settlement pool or an actuarial value for the undivided interest held by the pension system in the life insurance settlement pool, and/or an actuarial value of an undivided interest held by the pension system in each of the life insurance settlement contracts in the life insurance settlement pool on a periodic or other basis; and a component for communicating the actuarial value of the life insurance settlement pool or the actuarial value for the undivided interest held by the pension system in the life insurance settlement pool and/or the actuarial value of an undivided interest held by the pension system in each of the life insurance settlement contracts in the life insurance settlement pool to at least one pension system that owns an undivided interest in the life insurance settlement pool; and further comprising electronic storage; and a set of processors that use the electronic storage and include among them computer logic elements, wherein set means at least one, and wherein at least two of the foregoing components are implemented in computer logic elements embodied among the set of processors.

In a further embodiment of the present invention, a system is provided comprising: a component for a pension system investing one or more pension system assets to obtain an undivided interest in an life insurance settlement pool that comprises a plurality of life insurance settlement contracts, wherein each insurance settlement contract either (a) provides a plurality of periodic payments during the life of an insured or (b) provides a single death benefit on the life of an insured, but in either case, the insured is not a beneficiary of the pension system, and wherein each insurance settlement contract meets at least one predetermined criterion; a component for receiving registration information that references the life insurance settlement pool and/or each insurance settlement contract in the life insurance settlement pool; a component for receiving an actuarial value of the life insurance settlement pool, or an actuarial value of an undivided interest held by the pension system in the life insurance settlement pool, or an actuarial value of an undivided interest held by the pension system in each of the life insurance settlement contracts in the life insurance settlement pool, on a periodic or other basis; a component for calculating or having calculated electronically a UAL (unfunded actuarial accrued liability) based in part on the actuarial value of the life insurance settlement pool, or the actuarial value of the undivided interest held by the pension system in the life insurance settlement pool, or the sum of the actuarial values of the undivided interests held by the pension system in the life insurance settlement contracts in the life insurance settlement pool; a component for calculating or having calculated electronically a UAL amortization based at least in part on the UAL; and a component for communicating or having communicated a report or a network reference to the report to a third party that includes data based at least in part on the UAL amortization, and further comprising electronic storage; and a set of processors that use the electronic storage and include among them computer logic elements, and wherein set means at least one, and wherein at least two of the foregoing components are implemented in computer logic elements embodied among the set of processors.

In a further embodiment of the present invention, a method is provided for operating as a trustee of assets for a pension system, comprising: generating or receiving a plurality of files or a reference or references to a plurality of files that form an life insurance settlement pool, wherein each file includes information on a life insurance settlement contract that either (a) provides a plurality of periodic payments during the life of an insured or (b) provides a single death benefit on the life of an insured, but in either case, the insured is not a beneficiary of the pension system, and wherein each file includes information on an insurance settlement contract that meets at least one predetermined criterion; issuing payment instructions and/or payment instruments to maintain each of a plurality of the life insurance settlement contracts in the life insurance settlement pool in effect; registering in an electronic database an ownership interest for the pension system in the life insurance settlement pool and/or in each insurance settlement contract in the life insurance settlement pool; electronically determining or having determined a proportionate share of the life insurance settlement pool based on an amount of value provided by the pension system for its investment and on total assets in the life insurance settlement pool at the time of purchase; paying out or having paid out proceeds from the insurance policies in accordance with a predetermined priority of distribution; electronically generating or having generated an actuarial value of the life insurance settlement pool or an actuarial value for the undivided interest held by the pension system in the life insurance settlement pool, and/or an actuarial value of an undivided interest held by the pension system in each of the life insurance settlement contracts in the life insurance settlement pool on a periodic or other basis; and communicating the actuarial value of the life insurance settlement pool or the actuarial value for the undivided interest held by the pension system in the life insurance settlement pool and/or the actuarial value of an undivided interest held by the pension system in each of the life insurance settlement contracts in the life insurance settlement pool to at least one pension system that owns an undivided interest in the life insurance settlement pool.

In yet a further embodiment of the present invention, a method is provided comprising: a pension system investing one or more pension system assets to obtain an undivided interest in an life insurance settlement pool that comprises a plurality of life insurance settlement contracts, wherein each insurance settlement contract either (a) provides a plurality of periodic payments during the life of an insured or (b) provides a single death benefit on the life of an insured, but in either case, the insured is not a beneficiary of the pension system, and wherein each insurance settlement contract meets at least one predetermined criterion; receiving registration information that references the life insurance settlement pool and/or each insurance settlement contract in the life insurance settlement pool; receiving an actuarial value of the life insurance settlement pool, or an actuarial value of an undivided interest held by the pension system in the life insurance settlement pool, or an actuarial value of an undivided interest held by the pension system in each of the life insurance settlement contracts in the life insurance settlement pool, on a periodic or other basis; calculating or having calculated electronically a UAL (unfunded actuarial accrued liability) based in part on the actuarial value of the life insurance settlement pool, or the actuarial value of the undivided interest held by the pension system in the life insurance settlement pool, or the sum of the actuarial values of the undivided interests held by the pension system in the life insurance settlement contracts in the life insurance settlement pool; calculating or having calculated electronically a UAL amortization based at least in part on the UAL; and communicating or having communicated a report or a network reference to the report to a third party that includes data based at least in part on the UAL amortization.

These and other embodiments, objects, advantages, and features of this invention will be apparent from the following detailed description and appended claims

BRIEF DESCRIPTION OF THE DRAWINGS

FIG. 6 is schematic block diagram illustrating an embodiment of the present invention.

DETAILED DESCRIPTION OF THE INVENTION

Figure 1:
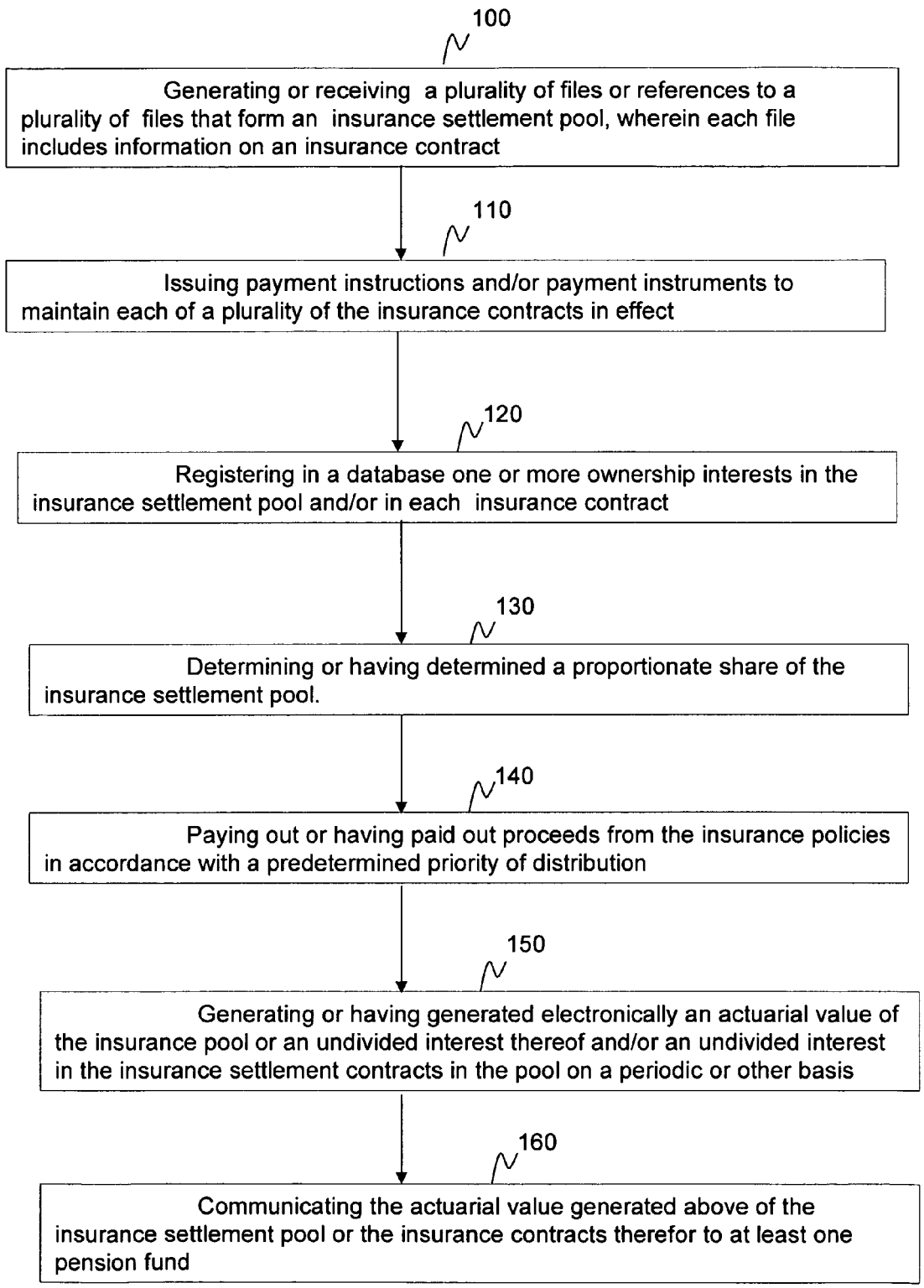
FIG. 1 is block diagram flowchart illustrating one embodiment of the present invention.

It will now be appreciated that some embodiments of the present invention create predictable and beneficial results to the acquiring pension system in a unique way. Typically, the investment of pension assets made when practicing methods of this invention will include a financial mechanism to meet all future premium obligations (a "premium reserve") to provide for payment of costs of keeping the contract(s) enforceable. The premium reserve may constitute part of the acquisition price or may be established independently. Also, in some embodiments it is preferred that the insureds on life insurance settlement contracts be relatively healthy and elderly (i.e., typically at least 50 years of age, preferably at least 60 years of age, and more preferably at least 65 years of age). The term "healthy" when used in this description and the appended claims means not chronically or terminally ill, where chronically ill means a) being unable to perform at least two activities of daily living (i.e., eating, toileting, transferring, bathing, dressing or continence) or b) requiring substantial supervision to protect the individual from threats to health and safety due to severe cognitive impairment, and terminally ill means having an illness or sickness that can reasonably be expected to result in death in twenty-four months or less.

The remaining life expectancy of the insured, or of at least one of the insureds, under the one or more life insurance settlement contracts employed in embodiments of this invention will be no more than about 20 years, and more preferably no more than about 15 years. Even more preferably when dealing with interests in pools of the relevant life insurance settlement contracts, the life expectancy of at least a majority of the insureds will be no more than 20 years, and most preferably no more than 15 years.

Pension systems practicing the present invention in some embodiments will establish a criteria profile for current insurance policies, or for current interests in pools of insurance policies, to be acquired. For example, one profile could limit the acquired contracts or interests to those priced at an acquisition cost below a target percentage of the present value of the payment stream (for an annuity or pool of annuities) or below a target percentage of the death benefit (for a life insurance settlement contract) or total death benefits (for a pool of life insurance settlement contracts), taking into account the purchase price and premium reserve which might be established, as applicable. The contracts sought will be typically only those which are transferable, either by law or by their own terms, and appropriate proof of validity of transfer will be included in the contract acquisition documentation. The contracts sought will be acquired in a diverse manner such that there will be no relative concentration of dollar value amounts attributable to a single insured or carrier. In the case of life insurance settlement contracts, the present invention provides the added benefits of third party underwriting of the health risk of the insureds, and provides legal title, lien clearance, and defense waiver and other protections by giving insurance carrier and beneficiary recognition of ownership transfer. Other benefits of some embodiments may include the use of third party servicers to hold any premium reserve and to service premium payment obligations which will have been expressly quantified in the life insurance settlement contract at time of acquisition.

Thus, in practicing the present invention, pension systems or others will preferably engage in a method comprising (1) establishing a criteria profile for acquired life insurance policies, (2) establishing one or more contractual agreements with providers of necessary services to accomplish acquisition of the policies, such providers including, e.g., policy acquisition agents, insured health screeners/underwriters, escrow agents, and independent actuaries, amongst others, and (3) establishing contractual agreements with providers of necessary services to maintain enforceability of acquired policies. Such necessary services may include, e.g., matching the premium payment schedule of each discrete life insurance settlement contract to escrow agent instructions for payment, monitoring receipt of premium payments by carriers, monitoring health of insured(s), processing death benefit claims, and the like. Once these steps have been carried out, in no particular order, the pension systems preferably will then (1) acquire (a) individual policies or (b) pools of policies to diversify carrier risk and to diversify insured risk, and (2) establish and manage corporate or trust entities to hold and administer qualifying acquired policies, or pools of qualifying acquired policies, for the benefit of single or multiple pension systems.

Practicing this method will provide an immediate benefit by increasing the aggregate value of assets in a pension system, the consequence of which is the positive impact on pension system assets and any UAL, and the corresponding reduction in the requirement to make any annual UAL Amortization. Practicing this method on a regular disciplined basis over time will provide the ongoing benefit of accelerating the reduction of any UAL and reducing any corresponding annual UAL Amortization. An exemplary scenario will now be presented to illustrate, in a non-limiting way, how one embodiment of this invention may be employed.

EXAMPLE

For life settlement contracts meeting the criteria of one embodiment of a method of this invention, the following ratio will apply:

$\$B > \$V > \$C.$ wherein, for each conforming life insurance settlement contract, $B is the death benefit, $V is the actuarial present value and equals the sum of the amounts calculated for every out year through the final year of an actuarial table appropriate to the respective insured, wherein each amount calculated for every out year comprises the present value, at an appropriate interest rate, of the product of the probability that the insured will die during such out year multiplied by the death benefit $B, all in accordance with generally accepted actuarial practices; and $C is the life settlement contract purchase price and equals the amount required to acquire a contract, being the sum of the life settlement contract sale price including transaction costs and the costs of a premium reserve, if any. Immediately after a pension system uses the invention's method to acquire a conforming contract at $C, the valuation of the contract in accordance with generally accepted actuarial practices will cause the value of the contract to increase to $V. $V will further increase at each valuation period as the probability of the insured's death in each out year increases (interest rates remaining constant). The increase at each valuation period of $V (interest rates remaining constant) will only be interrupted by the occurrence of the death of the insured during a period, and the concurrent payment of the death benefit $B to the pension system, thereby converting the value of the contract asset to $B, an amount always greater than $V. A change in the interest rate used to calculate present value will affect valuation results, but will be balanced to a degree in each pension system by the opposite effect on the value of other assets held by the pension system.

Embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

Embodiments of the invention are described in the general context of method steps, which may be implemented in one embodiment by a program product including computer-executable instructions, such as program code, executed by computers in networked environments. Generally, program products include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Embodiments of the present invention may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices. Furthermore, databases described herein as part of the present invention may be stand-alone databases or distributed database systems comprising a plurality of databases connected to or accessible by a common processor.

Software and web implementations of the present invention could be accomplished with programming techniques with rule based logic and other logic to accomplish the various database searching steps, correlation steps, comparison steps, calculation steps and decision steps. It should also be noted that the word "component" as used herein and in the claims is intended to encompass implementations using one or more lines of software code, and/or hardware implementations, and/or equipment for receiving manual inputs.

In one embodiment of the invention, the pension systems, the trustees and various other participants, may each utilize a general purpose computer system connected to an electronic network, such as a computer network. The computer network can also be a public network, such as the Internet. By way of example, the computer system may include a central processing unit (CPU) connected to a system memory. The system memory typically contains an operating system, a BIOS driver, and application programs. The application programs include one or more calculation routines for calculating various values for various parameters to be discussed hereinafter using appropriate algorithms. The application programs provide appropriate application programming interfaces (API) through which the relevant calculations and communications can be implemented. Additionally, the application programs may access various distributed external databases. In addition, the computer system contains input devices such as a mouse and a keyboard, and output devices such as a printer and a display monitor. The computer system generally includes a communications interface, such as an ethernet card, to communicate to the electronic network. Other computer systems also connect to the electronic network which can be implemented as Wide Area Network (WAN) or as an internetwork such as the Internet. One of skill in the art would recognize that the above system describes the components of a computer system connected to an electronic network. It should be appreciated that many other similar configurations are within the abilities of one skilled in the art and all of these configurations could be used with the method of the present invention. Furthermore, it should be recognized that the computer system and network disclosed herein can be programmed and configured, by one skilled in the art, to implement the method steps discussed further herein.

For the present application, "API"—or application programming interface is a library of programmatic methods provided by a system of some kind (an example is a web-based imaging system) that enables client programs (web content operating within the browser is one example) to interact with that system. One method of creating an API is to create a library. For example, in Java, a library (conventionally called a jar file) is created by defining a class or classes, compiling the class or classes, and grouping the class or classes into a library.

Note that communication methods between entities and entity systems can be implemented using a variety of methods ranging from direct contact with a system computer via an appropriate API, direct contact over the Internet to a host server computer for the entity via a TCP/IP protocol, and optionally on the Web using the HTTP protocol, normal telephone calls to a representative, faxes, e-mails, third-party customer representatives in a bank or other institution.

Referring now to FIG. 1, there is illustrated one embodiment of the present invention relating to a method for operating as a trustee of assets for a pension system. In block 100, the operation step is provided of receiving or generating a plurality of electronic files or references to a plurality of electronic files, or electronic image files, or paper files that form an life insurance settlement pool, wherein each file includes information on an insurance settlement contract that either (a) provides a plurality of periodic payments during the life of an insured or (b) provides a single death benefit on the life of an insured, but in either case, the insured is not a beneficiary of the pension system, and wherein each file includes information on an insurance settlement contract that meets at least one predetermined criterion. Note that in one embodiment this initial selection based on one or more predetermined criteria and the acquisition of the life insurance settlement contracts could be performed by a third party originator. This third party originator could act as an agent to purchase the life insurance settlement contracts for a trustee. Alternatively, the third party originator could purchase these life insurance settlement contracts on its own behalf and then sell them to the trustee. The one or more criteria could be set and communicated electronically or manually by mail or otherwise to the third party originator by the trustee. Note that in another embodiment, the trustee could perform the selection and acquisition operations directly following a set of predetermined criteria.

Note that example criteria for selection of the life insurance settlement contracts could include whether there is a single death benefit, only life insurance settlement contracts where the life expectancy of the insured is no more than 20 years, only life insurance settlement contracts where the life expectancy of the insured is no more than 15 years, a requirement for a predetermined gender mix in the life insurance settlement pool, a requirement for a predetermined age range for the insureds in the life insurance settlement pool, and various other criteria. Note that the particular set of criteria chosen is not limiting on the invention and is typically determined by business practices.

Note that the data structure for an electronic file for each of the life insurance settlement contracts in the life insurance settlement pool could comprise fields for the following items
Type of Policy
Identification of the Insured
Carrier for the insurance settlement contract
Policy number for the insurance settlement contract
Premium payment schedule dates
Death benefit amount
Gender
Insureds age
Underwriting classification (for example smoker or nonsmoker)
Date of birth
Life expectancy
Mortality multiple
Portfolio cost
Annual premium
Date of original portfolio purchase
Policy paidup date
Insureds age at policy paid up date
Maturity date of policy
Maturity value upon maturity date and various other items of interest such as, for example details of the medical history of the insured or a network reference thereto.

Referring now to block 110, the operation step is provided of electronically issuing payment instructions to a third party insurance settlement contract servicer and/or payment instruments to maintain each of a plurality of the life insurance settlement contracts in the pool in effect. This operation comprises, in one embodiment, the trustee making payment authorization via a contract to a third party insurance servicer firm to keep the life insurance settlement contracts in force and/or actually sending the checks or other forms of payment in accordance with the instructions of the servicer to respective insurance companies for the policies in the life insurance settlement pool to keep the life insurance settlement contracts in the pool in force.

Referring now to block 120, the operation step is provided of registering in an electronic database an ownership interest for the pension system in the life insurance settlement pool and/or in each life insurance settlement contract in the life insurance settlement pool. Note that the pension system may be a public or private pension system. The reason for maintaining a registration of an ownership interest in each life insurance settlement contract is to maintain a desired actuarial treatment, if necessary under actuarial rules. This operation could be performed by a trustee computer receiving information on a purchase by a pension system of an undivided interest (defined as a percentage of each life insurance settlement contract in the life insurance settlement pool) in the life insurance settlement pool, and updating a trustee database with the amount of the undivided ownership interest in the life insurance settlement pool and the life insurance settlement contracts in the pool, and information on the identity of the pension system.

Referring to block 130, the operation step is provided of determining or having determined a proportionate share of the life insurance settlement pool based on the total assets in the pool at that time and an amount of money provided by the pension system for their investment in the life insurance settlement pool. For example, this proportionate share could be 5%, 10%, or 30%. Note that this step may be accomplished in one embodiment via a computer calculation, wherein various values are loaded into appropriate registers in the computer and calculations are performed by an appropriate microprocessor programmed to perform the calculation. In one embodiment, the trustee may authorize a third party servicer to make this determination.

Referring to block 140, the operation step is provided of accounting for the receipts from the individual life insurance settlement contracts and paying out proceeds from the insurance policies in accordance with a predetermined priority of distribution. In one embodiment, this operation could be performed by the trustee paying in accordance with a distribution priority the proceeds from the insurance policies as individuals covered by the respective policies die. By way of example, such a distribution priority might comprises, first paying any required administrative costs and maintenance costs, then paying the premium reserve until it reaches a predetermined level, and then paying any remainder from the proceeds to the owners of the undivided interests in the life insurance settlement pool in accordance with their respective ownership interests. Note that a variety of distribution priorities are possible, so that the particular distribution priority is not limiting on the invention. Alternatively, this operation could be performed by a third party servicer in accordance with a contract.

Referring to block 150, the operation step is provided of generating or having generated an actuarial value of the insurance pool or an actuarial value for the undivided interest in the life insurance settlement pool or an actuarial value of an undivided interest held by the pension system in each of the life insurance settlement contracts in the life insurance settlement pool, on a periodic or other basis. Note that this step may be accomplished in one embodiment via a computer calculation, wherein various values are loaded into appropriate registers in the computer and calculations are performed by an appropriate microprocessor programmed to perform the calculation. In one embodiment of the invention, this actuarial calculation can be performed in-house using an actuarial calculation program loaded into a computer. In an alternative embodiment, this operation could be generated by a third party actuarial firm in accordance with the instructions of the trustee. Note that the phrase "periodic or other basis" is defined to mean that the actuarial value can be generated periodically, such as yearly, or can be performed multiple times, but on a non-periodic basis. For example, the non-periodic basis could be when a criteria is met such as the occurrence of an event like a pension system request for actuarial valuation.

Referring to block 160, the operation step is provided of electronically communicating the actuarial value of the life insurance settlement pool, or the actuarial value of the particular undivided interest in the life insurance settlement pool held by the pension system, and/or the undivided interest held by the pension system in each insurance settlement contract in the life insurance settlement pool to that pension system that owns the undivided interest and to other appropriate parties and contractors. Note that if an actuarial value is computed for the particular undivided interests in the life insurance settlement pool held by the various pension systems and other parties, then customized communications based on these different actuarial values of the undivided interests of the particular owners could be generated. These customized communications could be provided, for example, via a network connection to an accounting program in a main computer of each of the various pension systems that hold undivided interests. Alternatively, the communication could be by network to a third party entity that performs operations under contract for the particular pension system, or the communication could be by mail or hand delivery, for example.

Note that in accordance with this method, the following impact will occur for the pension system: the actuarial value of the life insurance settlement pool assets will grow in value over time, thereby offsetting at least some of the fluctuations in the UAL for the pension system. This occurs because the remaining life expectancy of the insured or the remaining life expectancy of each of the insureds, when determined at least immediately after the acquisition, is such that (i) the total value of the pension system assets, inclusive of the life insurance settlement pool, determined immediately after the acquisition of the life insurance settlement pool, is greater than (ii) the total value of the pension system assets, exclusive of the life insurance settlement pool and inclusive of the one or more pension system assets used for the investment just prior to the investment, the respective total values of (i) and (ii) being determined at the same point in time and in accordance with the same actuarially sound valuation method. In essence, the foregoing means that the actuarial value of the undivided interest acquired in the life insurance settlement pool is greater than the assets used to purchase the interest in the life insurance settlement pool.

In one embodiment of the invention, the actuarial value of the entire life insurance settlement pool is communicated to a plurality of pension funds. In an alternative embodiment, the communication step comprises generating and sending a customized communication to each of a plurality of different pension funds based on the actual value of the particular undivided interest held by the particular pension system. Alternatively or in addition, the actuarial value of the undivided interest held by the pension system in each of the life insurance settlement contracts may be communicated.

In a further embodiment, the step is provided of calculating or having calculated a UAL (unfunded actuarial accrued liability) amortization for at least one pension system, and generating a communication based in part on the UAL (unfunded actuarial accrued liability) amortization.

In a further embodiment of the invention, steps may be provided to facilitate sales in the secondary market of undivided interests in the life insurance settlement pool. In one embodiment, such steps would comprise obtaining an origination life expectancy for the life insurance settlement pool at the time of origination, obtaining information on a comparison of the origination life expectancy to actual mortality data for the life insurance settlement pool, and communicating the information on the comparison to a program that sets the price for the life insurance settlement contracts. Such a program would take into account elements such as this comparison data, aspects of the life insurance settlement contracts remaining in the life insurance settlement pool at the time of this determination, etc., in determining a price for an undivided interest in the life insurance settlement pool that is to be sold in the secondary market.

Figure 2:
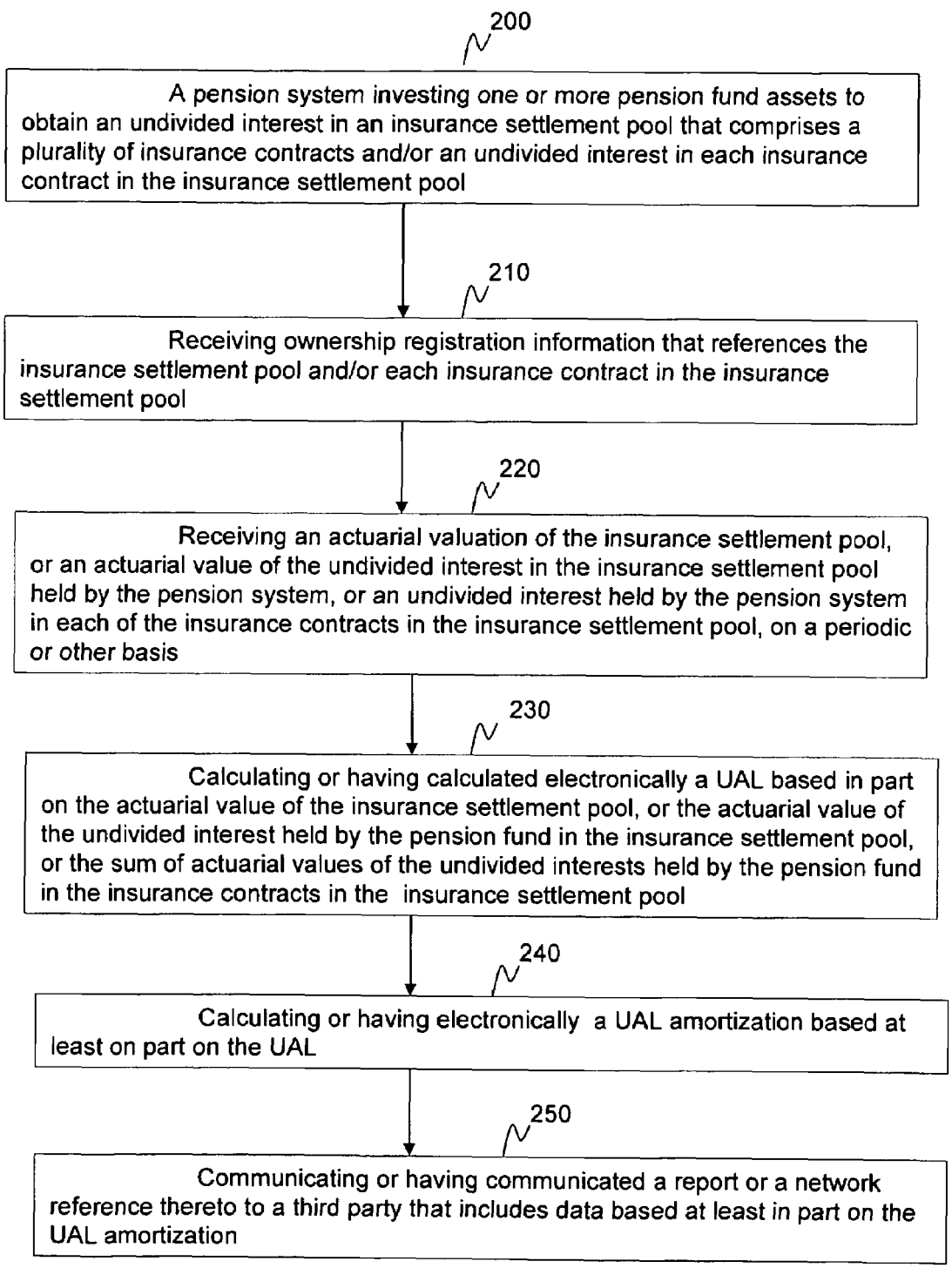
FIG. 2 is block diagram flowchart illustrating a further embodiment of the present invention.

Referring now to FIG. 2, a further embodiment of the present invention is illustrated. In block 200 the step is provided of a pension system investing one or more pension system assets to obtain an undivided interest in an life insurance settlement pool that comprises a plurality of life insurance settlement contracts and/or an undivided interest in each insurance settlement contract in the life insurance settlement pool, wherein each insurance settlement contract either (a) provides a plurality of periodic payments during the life of an insured or (b) provides a single death benefit on the life of an insured, but in either case, the insured is not a beneficiary of the pension system, and wherein the life insurance settlement contracts meet at least one predetermined criterion. By way of example, the undivided interest could be 5%, 10%, 30% or any other convenient percent. that example criteria have been set forth above, and include whether there is a single death benefit, wherein the life expectancy of the insured is no more than 20 years, wherein the life expectancy of the insured is no more than 15 years, a predetermined gender mix in the insurance pool, a predetermined age range for the insureds in the insurance pool, and various other criteria. Note that the particular criteria chosen is not limiting on the invention.

Referring to block 210, the operation step is provided of receiving ownership registration information that references the life insurance settlement pool and/or each insurance settlement contract in the life insurance settlement pool. By way of example, this information could comprise an identification of the life insurance settlement pool, an identification of each insurance settlement contract by policy number, an identification of the insured, the policy amount, and various other items of information. In one embodiment, this information could be received as a plurality of electronic data files, each with a data structure that includes fields for the appropriate information. Note that alternatively, the ownership registration information could comprise a network reference, for example a URL, for each of the life insurance settlement contracts, wherein the detailed information on the particular insurance settlement contract could be accessed via a network using this network reference. In an alternative embodiment, such ownership registration information could be provided in paper files.

Referring to block 220, the operation step is provided of receiving an actuarial value of the life insurance settlement pool, or an actuarial value of the undivided interest held by the pension system in the life insurance settlement pool, or an actuarial value of an undivided interest held by the pension system in each of the life insurance settlement contracts in the life insurance settlement pool, on a periodic or other basis. This step could be performed via an electronic communication of the actuarial valuation, or via a manual communication.

Referring to block 230, the operation step is provided of calculating or having calculated by a service contractor electronically or manually a UAL (unfunded actuarial accrued liability) based in part on the actuarial value of the life insurance settlement pool, or the actuarial value of the undivided interest held by the pension system in the life insurance settlement pool, or the sum of the actuarial values of the undivided interests held by the pension system in the life insurance settlement contracts in the life insurance settlement pool. Note that this step may be accomplished in one embodiment via a computer calculation, wherein various values are loaded into appropriate registers in the computer and calculations are performed by an appropriate microprocessor programmed to perform the calculation. Note that this calculation could be performed on a periodic or a periodic basis, so that more than a year could elapse between calculations for a given pension system.

Referring to block 240, the operation step is provided of calculating or having calculated electronically a UAL amortization based at least in part on the UAL. Note that this step may be accomplished in one embodiment via a computer calculation of the UAL, wherein various values are loaded into appropriate registers in the computer and calculations are performed by an appropriate microprocessor programmed to perform the calculation.

Referring to block 250, the operation step is provided of communicating or having communicated a report or a network reference thereto to a third party that includes data based at least in part on the UAL amortization. The communication may be via a network communication of the report itself, or the communication of a network reference to the report, for example a URL, or a via mail or other manual communication, to one or more appropriate parties. For example the report or network reference thereto may be communicated to a pension governing board.

Note that in an alternate embodiment of the invention, the life insurance settlement pool may be categorized by classification. That is, the life insurance settlement contracts can be organized by characteristic of the insured, such as, for example, by life expectancy or the insured, by age range, or health, or gender mix. This categorization can be used on the secondary market to set the price for an interest in the life insurance settlement pool at some time after origination.

Figure 3:
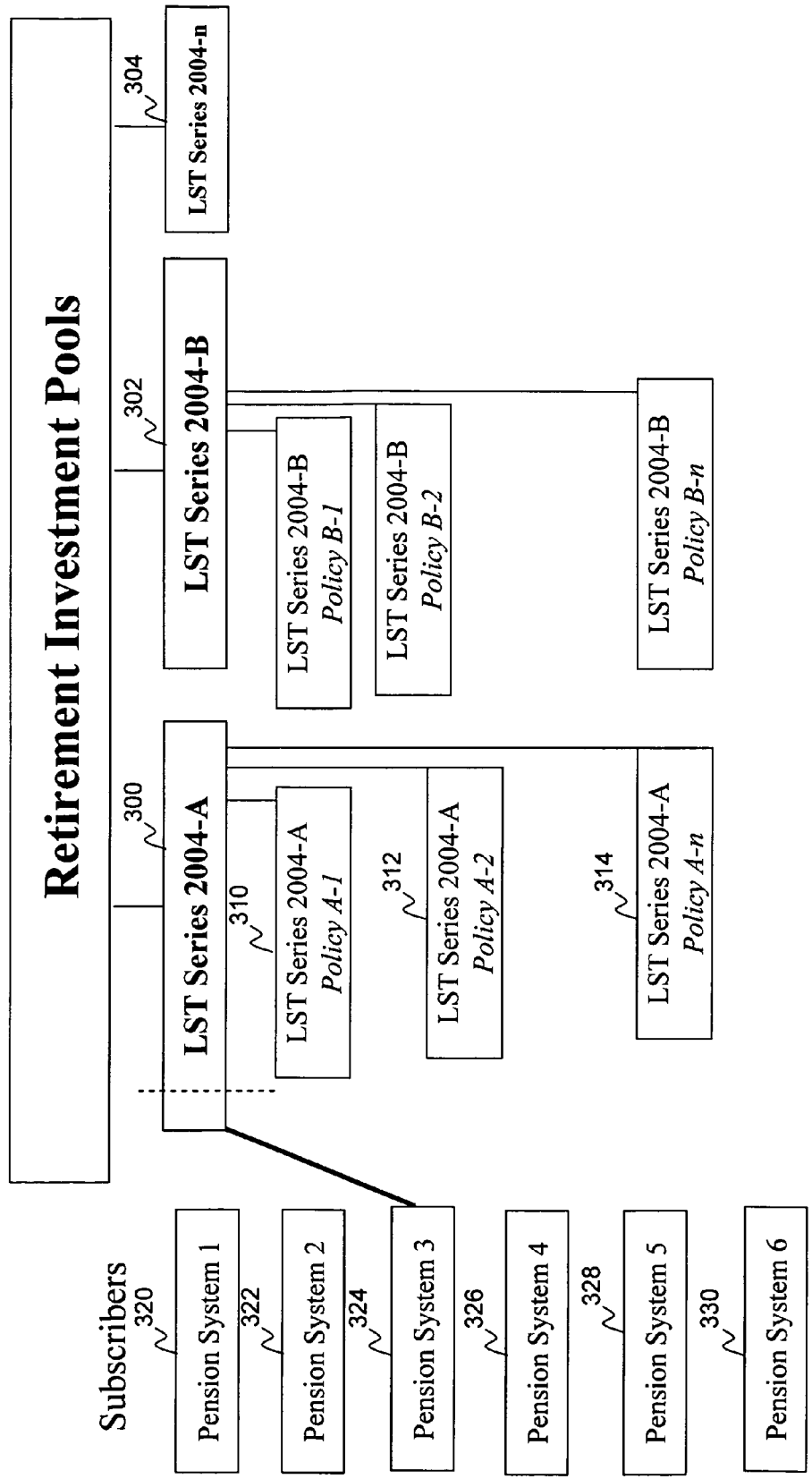
FIG. 3 is schematic block diagram illustrating an embodiment of the present invention.

Selected embodiments of the invention will now be illustrated. Referring to FIG. 3, an example of a set of life insurance settlement pools 300, 302, and 304 are illustrated. Each of the pools comprises a set of life insurance settlement contracts. In the figure, life insurance settlement pool 300 for example includes the life insurance settlement contracts 310, 312, and 314. A set of different pension systems 320-330 are shown. In FIG. 3, pension system 324 is shown as having purchased an undivided interest in the life insurance settlement contract pool 300 and the dashed vertical line through the block 300 represents the fact that the pension system 324 owns an undivided interest in life insurance contract settlement pool 300 and in each of the life insurance settlement contracts in the pool 300.

Figure 4:
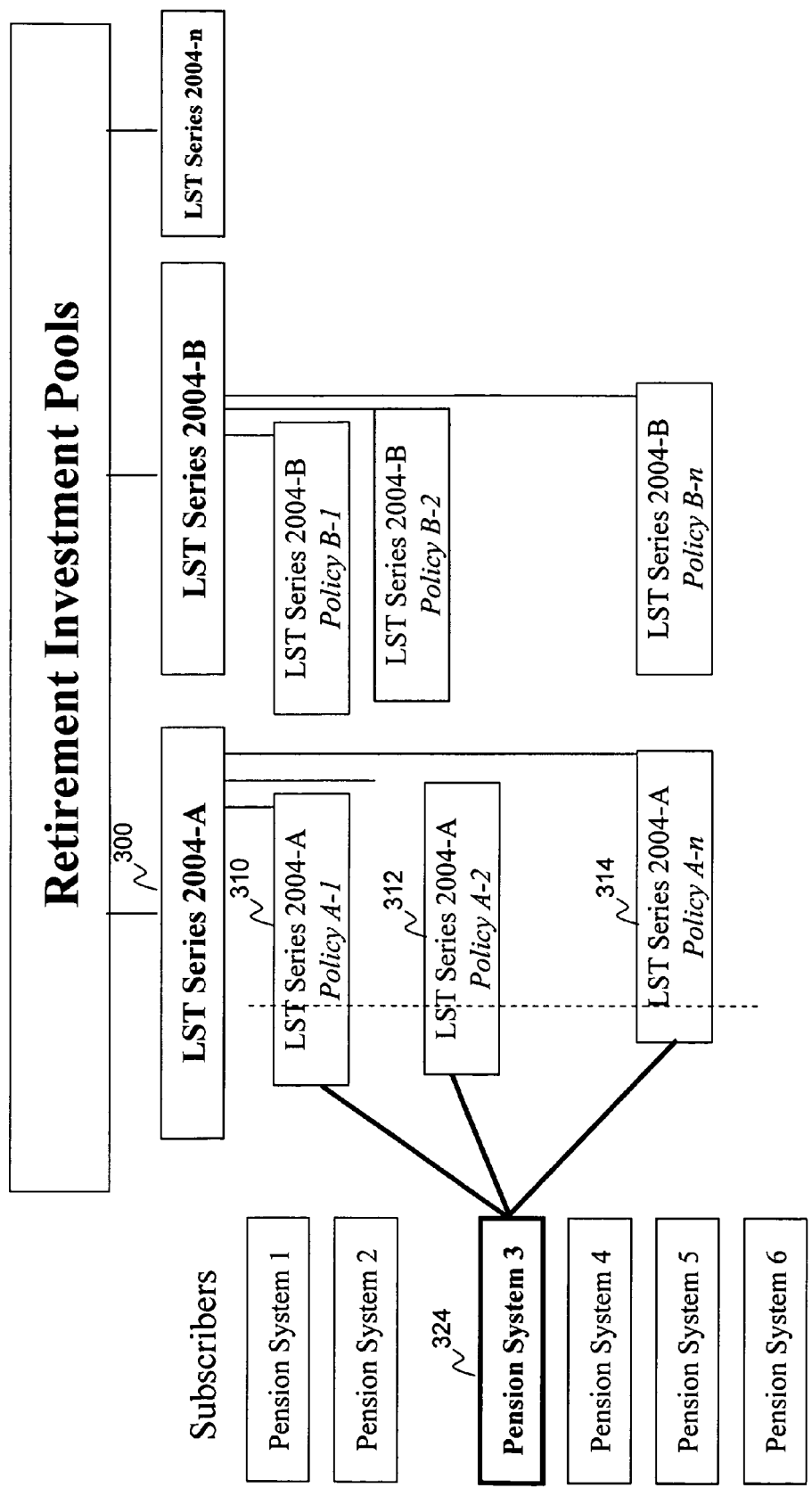
FIG. 4 is schematic block diagram illustrating an embodiment of the present invention.

Referring to FIG. 4, it is clarified that the undivided interest in the life insurance settlement pool means an undivided interest in each of the life insurance settlement contracts. In the example shown in FIG. 4, the pension system 324 owns an undivided interest in a portion of each of the life insurance settlement contracts 310, 312, and 314 in the life insurance settlement pool 300.

Figure 5:
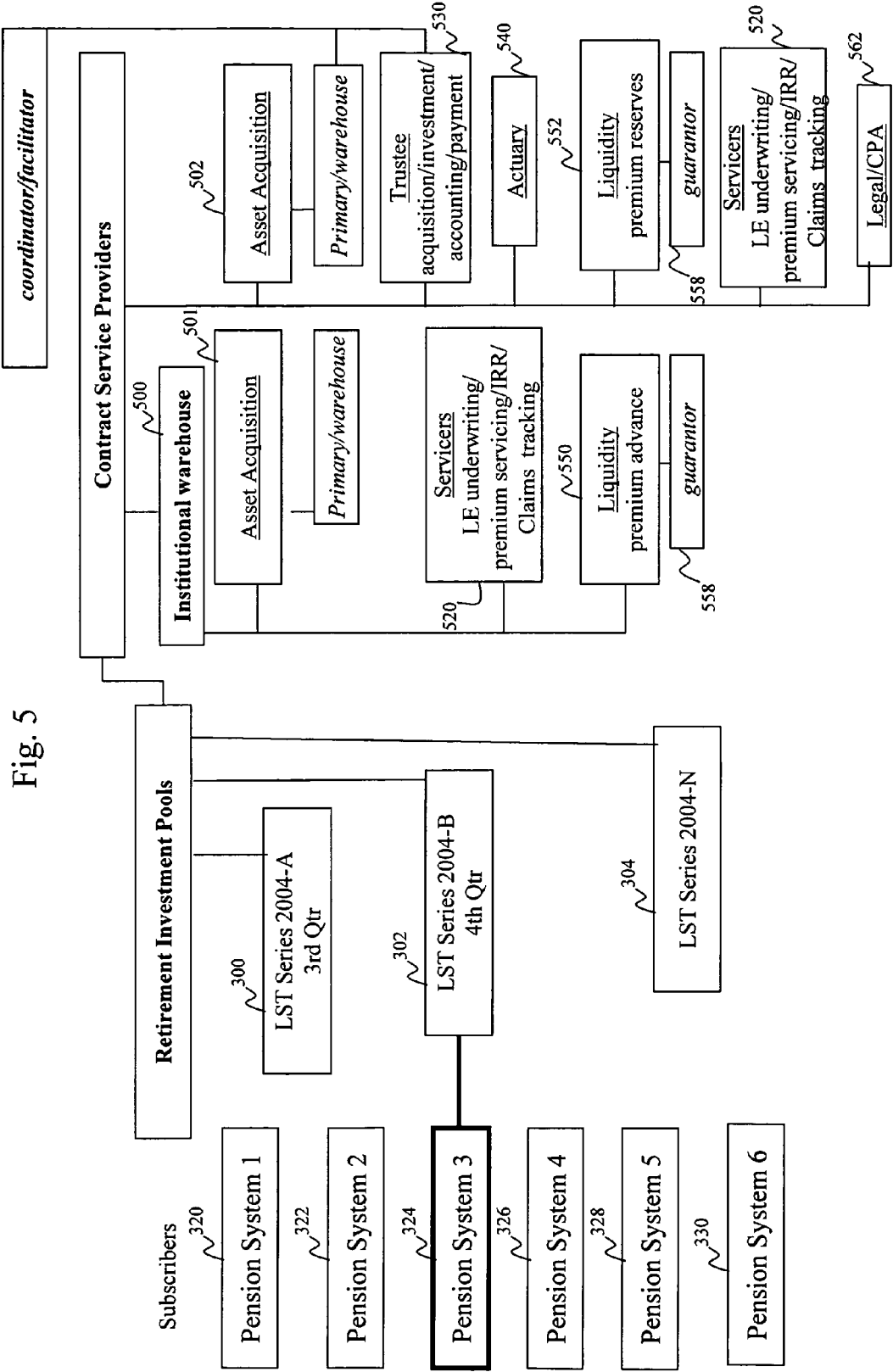
FIG. 5 is schematic block diagram illustrating an embodiment of the present invention.

Referring to FIG. 5, there is shown the interrelationship and communications interface with selected participants in an embodiment of the invention. Each or a selected plurality of these contract service providers may, in one embodiment, be connected to communicate via appropriate network connections using appropriate API's. The various life insurance settlement pools are illustrated as pools 300, 302, and 304. Various contract service providers are illustrated on the right side of the figure. In the figure, asset acquirers 501 and 502 are shown. These contract service providers operate to acquire the life insurance settlement contracts in accordance with the aforementioned predetermined criteria. The primary/warehouse block indicates that the life insurance settlement contract acquirer could buy the contracts on a contract by contract basis (primary), or alternatively or in addition, the life insurance settlement contract acquirer could acquire the contracts from a warehouse operation that acquires such contracts. The actual life insurance settlement contracts may be maintained in data warehouses, which may comprise paper file warehouses or electronic warehouses, that for example, may include electronic images of the insurance settlement contract paper work. One or more underwriting and premium service providers 520 provide medical underwriting services (typically performed at contract acquisition, but may also be performed later for the secondary market) and premium serving to maintain the life insurance settlement contracts in force based on appropriate predetermined payment schedules for the life insurance settlement contracts. Other contract service providers, also represented in block 520, could also provide internal rate of return (IRR) calculation and claims tracking and valuation. Note that an institutional warehouse block 500 is shown and represents a single operator performing multiple contract functions including contract acquisition.

A trustee 530 is shown connected to the network. As noted previously, the trustee 530 holds the various life insurance settlement contracts in trust for the beneficial owners. The beneficial owners, in the illustrated embodiment, are the pension systems 320-330. An actuary 540 is shown that may be used to make the various actuarial calculations and communicate electronically or otherwise that information to the trustee and/or the beneficial owners. Liquidity servicer 550 operates to advance premiums upon there being insufficient funds available to the trustee. Note that the guarantor block 558 therebelow indicates that this liquidity obligation may be guaranteed by a third party. Liquidity servicer 552 operates to advance premiums to the various insurance carriers for the life insurance settlement contracts in the life insurance settlement pools. Again there may be a guarantor 558. Finally, a contract legal/CPA servicer 562 may be provided.

Referring to FIG. 6, various service processing entities are shown for an embodiment of the present invention, with functions that they may perform set forth below the servicer, and with contractual agreements that govern the relationships and the functions of the servicer at the bottom of the figure. The originator 500/502 selects the various insurance contacts in accordance with the predetermined criteria discussed previously. The originator may also have the functions of premium/policy maintenance, death benefit claims tracking and valuation, internal rate of return cash flow (IRR) calculation (may be performed annually or over some other periodic or a periodic basis), asset valuation by an actuary, and licensor of the overall process. The originator's operation will be governed by an origination agreement. The trustee 530 in this embodiment performs the functions of maintaining and accounting for funds collected from death benefits and funds disbursed for premium payment and other administrative costs and interest earnings thereon. The trustee functions will be governed by trust indenture and escrow agreements where appropriate.

The actuary 540 will perform the actuarial function in accordance with appropriate services agreements. The liquidity facility/guarantor 550/552 performs the function of providing liquidity for funds available on a timely basis to make premium payments when due when trust resources are not sufficient in accordance with appropriate liquidity facility/ guaranty agreements. Likewise the pension systems 320-330 that hold the certificates (the paper showing the undivided interest) receive distributions and annual IRR valuations in accordance with a trust indenture/escrow agreement and receive the actuarial valuation.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the, word "component" as used herein and in the claims is intended to encompass implementations using one or more lines of software code, and/or hardware implementations, and/or equipment for receiving manual inputs.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principals of the present invention and its practical application to enable one skilled in the art to utilize the present invention in various embodiments and with various modifications as are suited to the particular use contemplated.

Note that aspects of the claims may be performed by different entities that operate in cooperation in accordance with a written contract or other agreement to perform the claimed operation.

Terms used in this description and the appended claims, which terms are not otherwise specifically defined in this description, shall have their ordinary and customary meaning as understood by one of ordinary skill in the art when read in the context of this disclosure.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

The invention claimed is:

1. A program product for operating as a trustee of assets for a pension system, comprising:

a set of computer readable media, wherein set means at least one, having computer readable program code to be executed by a computer embodied therein, or among them if more than one, the computer readable program code comprising program code configured to generate or receive a plurality of files or a reference or references to a plurality of files that form a life insurance settlement pool, wherein each file includes information on a life insurance settlement contract that either (a) provides a plurality of periodic payments during the life of an insured or (b) provides a single death benefit on the life of an insured, but in either case, the insured is not a beneficiary of the pension system, and wherein each file includes information on an insurance settlement contract that meets at least one predetermined criterion;

program code configured to issue payment instructions and/or payment instruments to maintain each of a plurality of the life insurance settlement contracts in the life insurance settlement pool in effect;

program code configured to register in an electronic database an ownership interest for the pension system in the life insurance settlement pool and/or in each insurance settlement contract in the life insurance settlement pool;

program code configured to electronically determine or have electronically determined a proportionate share of the life insurance settlement pool based on an amount of value provided by the pension system for its investment and on total assets in the life insurance settlement pool at the time of purchase;

program code configured to pay out or have paid out proceeds from the insurance policies in accordance with a predetermined priority of distribution;

program code configured to electronically generate or have electronically generated an actuarial value of the life insurance settlement pool or an actuarial value for an undivided interest held by the pension system in the life insurance settlement pool, and/or an actuarial value of an undivided interest held by the pension system in each of the life insurance settlement contracts in the life insurance settlement pool on a periodic or other basis; and program code configured to communicate the actuarial value of the life insurance settlement pool or the actuarial value for the undivided interest held by the pension system in the life insurance settlement pool and/ or the actuarial value of an undivided interest held by the pension system in each of the life insurance settlement contracts in the life insurance settlement pool to at least one pension system that owns an undivided interest in the life insurance settlement pool.

2. The program product as defined in claim 1, wherein the communication operation comprises program code configured to communicate the respective actuarial value of the respective undivided interest in the life insurance settlement pool to each of a plurality of pension systems holding respective undivided interests in the life insurance settlement pool.

3. The program product as defined in claim 1, wherein the communication operation comprises computer code configured to generate and send a customized communication to each of a plurality of different pension systems based on the respective actuarial value of the undivided interest of the particular pension system in the life insurance settlement pool and/or in each of the life insurance settlement contracts in the life insurance settlement pool held by that pension system.

4. The program product as defined in claim 1, further comprising
program code configured to calculate a UAL (unfunded actuarial accrued liability) amortization for at least one pension system; and
program code configured to generate a communication based in part on the UAL amortization to a pension system governing board.

5. The program product as defined in claim 1, further comprising program code configured to electronically communicate a set of predetermined criteria to an insurance settlement contract selection agent.

6. The program product as defined in claim 1, further comprising:
program code configured to obtain an average weighted life expectancy for the life insurance settlement pool;
program code configured to compare the anticipated weighted average life expectancy to actual mortality data for the insureds on the life insurance settlement contracts in the life insurance settlement pool; and
program code configured to communicate the information on the comparison to a program for setting a price for the undivided interest in a secondary market for the insurance settlement contract pool.

7. The program product as defined in claim 1, wherein a plurality of the life insurance settlement contracts are life insurance settlement contracts that provide a single death benefit on the life of an insured.

8. The program product as defined in claim 1, wherein the predetermined criterion is that the remaining life expectancy of the insured under the life insurance settlement contract is no more than 20 years.

9. The program product as defined in claim 1, wherein the predetermined criterion is that the remaining life expectancy of the insured under the life insurance settlement contract is no more than 15 years.

10. The program product as defined in claim 1, further comprising
program code configured to access a database of electronic files for life insurance settlement contracts;
program code configured to electronically select a plurality of the life insurance settlement contracts as the life insurance settlement contracts for the life insurance settlement contract pool based on a plurality of predetermined criteria.

11. The program product as defined in claim 1, wherein the at least one predetermined criterion is that a remaining life expectancy of the insured under the life insurance settlement contract is within a predetermined limit.

12. The program product as defined in claim 11, wherein the actuarial present value is calculated using a method to increase a value of the ownership interest in each of the life settlement contracts at each calculation period as a probability of death of a respective insured associated with a respective one of the life settlement contracts increases and the death of the respective insured has not occurred.

13. A program product comprising:
a set of computer readable media, wherein set means at least one, having computer readable program code to be executed by a computer embodied therein among them or among them if more than one, the computer readable program code comprising
program code for a pension system configured to authorize investment of one or more pension system assets to obtain an undivided interest in a life insurance settlement pool that comprises a plurality of life insurance settlement contracts, wherein each insurance settlement contract either (a) provides a plurality of periodic payments during the life of an insured or (b) provides a single death benefit on the life of an insured, but in either case, the insured is not a beneficiary of the pension system, and wherein each insurance settlement contract meets at least one predetermined criterion;
program code configured to receive registration information that references the life insurance settlement pool and/or each insurance settlement contract in the life insurance settlement pool;
program code configured to receive an actuarial value of the life insurance settlement pool, or an actuarial value of an undivided interest held by the pension system in the life insurance settlement pool, or an actuarial value of an undivided interest held by the pension system in each of the life insurance settlement contracts in the life insurance settlement pool, on a periodic or other basis;
program code configured to calculate electronically or have calculated electronically a UAL (unfunded actuarial accrued liability) based in part on the actuarial value of the life insurance settlement pool, or the actuarial value of the undivided interest held by the pension system in the life insurance settlement pool, or the sum of the actuarial values of the undivided interests held by the pension system in the life insurance settlement contracts in the life insurance settlement pool;
program code configured to calculate electronically or have calculated electronically a UAL amortization based at least in part on the UAL; and
program code configured to communicate or have communicated a report or a network reference to the report to a third party that includes data based at least in part on the UAL amortization.

14. The program product as defined in claim 13, wherein the remaining life expectancy of the insured or the remaining life expectancy of each of the insureds, when determined at least immediately after the acquisition, is such that (i) the total value of the pension system assets, inclusive of the life insurance settlement pool, determined immediately after the acquisition of the life insurance settlement pool, is greater than (ii) the total value of the pension system assets, exclusive of the life insurance settlement pool and inclusive of the one or more pension system assets used for the investment just prior to the investment, the respective total values of (i) and (ii) being determined at the same point in time and in accordance with the same actuarially sound valuation method, so that the actuarial value of the life insurance settlement pool assets will grow in value over time, thereby offsetting at least some of the fluctuations in the UAL for the pension system.

15. The program product as defined in claim 13, wherein the at least one predetermined criterion is that a remaining life expectancy of the insured under the life insurance settlement contract is within a predetermined limit.

16. The program product as defined in claim 15, wherein the actuarial present value is calculated using a method to increase a value of the ownership interest in each of the life settlement contracts at each calculation period as a probability of death of a respective insured associated with a respective one of the life settlement contracts increases and the death of the respective insured has not occurred.

17. A system for operating as a trustee of assets for a pension system, comprising:
one or more computers configured with the following components:
a component configured to generate or receive a plurality of files or a reference or references to a plurality of files that form a life insurance settlement pool, wherein each file includes information on a life insurance settlement contract that either (a) provides a plurality of periodic payments during the life of an insured or (b) provides a single death benefit on the life of an insured, but in either case, the insured is not a beneficiary of the pension system, and wherein each file includes information on an insurance settlement contract that meets at least one predetermined criterion;
a component configured to issue payment instructions and/or payment instruments to maintain each of a plurality of the life insurance settlement contracts in the life insurance settlement pool in effect;
a component configured to register in an electronic database an ownership interest for the pension system in the life insurance settlement pool and/or in each insurance settlement contract in the life insurance settlement pool;
a component configured to electronically determine or have electronically determined a proportionate share of the life insurance settlement pool based on an amount of value provided by the pension system for its investment and on total assets in the life insurance settlement pool at the time of purchase;
a component configured to pay out or have paid out proceeds from the insurance policies in accordance with a predetermined priority of distribution;
a component configured to electronically generate or have electronically generated an actuarial value of the life insurance settlement pool or an actuarial value for an undivided interest held by the pension system in the life insurance settlement pool, and/or an actuarial value of an undivided interest held by the pension system in each of the life insurance settlement contracts in the life insurance settlement pool on a periodic or other basis; and
a component configured to communicate the actuarial value of the life insurance settlement pool or the actuarial value for the undivided interest held by the pension system in the life insurance settlement pool and/or the actuarial value of an undivided interest held by the pension system in each of the life insurance settlement contracts in the life insurance settlement pool to at least one pension system that owns an undivided interest in the life insurance settlement pool.

18. The system as defined in claim 17, wherein the communication operation comprises a computer logic element configured to communicate the respective actuarial value of the respective undivided interest in the life insurance settlement pool to each of a plurality of pension systems holding respective undivided interests in the life insurance settlement pool.

19. The system as defined in claim 17, wherein the communication operation comprises a computer logic element configured to generate and send a customized communication to each of a plurality of different pension systems based on the respective actuarial value of the undivided interest of the particular pension system in the life insurance settlement pool and/or in each of the life insurance settlement contracts in the life insurance settlement pool held by that pension system.

20. The system as defined in claim 17, further comprising a computer logic element configured to calculate or have calculated a UAL (unfunded actuarial accrued liability) amortization for at least one pension system; and
a computer logic element configured to generate a communication based in part on the UAL amortization to a pension system governing board.

21. The system as defined in claim 17, further comprising a component configured to electronically communicate a set of predetermined criteria to an insurance settlement contract selection agent.

22. The system as defined in claim 17, further comprising:
a computer element configured to obtain an average weighted life expectancy for the life insurance settlement pool;
a computer element configured to compare the anticipated weighted average life expectancy to actual mortality data for the insureds on the life insurance settlement contracts in the life insurance settlement pool; and
a computer element configured to communicate information on the comparison to a program for setting a price for the undivided interest in a secondary market for the insurance settlement contract pool.

23. The system as defined in claim 17, wherein a plurality of the life insurance settlement contracts are life insurance settlement contracts that provide a single death benefit on the life of an insured.

24. The system as defined in claim 17, wherein the predetermined criterion is that the remaining life expectancy of the insured under the life insurance settlement contract is no more than 20 years.

25. The system as defined in claim 17, wherein the predetermined criterion is that the remaining life expectancy of the insured under the life insurance settlement contract is no more than 15 years.

26. The system as defined in claim 17, further comprising
a computer element configured to access a database of electronic files for life insurance settlement contracts;
a computer element configured to electronically select a plurality of the life insurance settlement contracts as the life insurance settlement contracts for the life insurance settlement contract pool based on a plurality of predetermined criteria.

27. The system as defined in claim 17, wherein the at least one predetermined criterion is that a remaining life expectancy of the insured under the life insurance settlement contract is within a predetermined limit.

28. The system as defined in claim 27, wherein the actuarial present value is calculated using a method to increase a value of the ownership interest in each of the life settlement contracts at each calculation period as a probability of death of a respective insured associated with a respective one of the life settlement contracts increases and the death of the respective insured has not occurred.

29. A system comprising:
one or more computers configured with the following components:
a component for a pension system configured to authorize investment of one or more pension system assets to obtain an undivided interest in a life insurance settlement pool that comprises a plurality of life insurance settlement contracts, wherein each insurance settlement contract either (a) provides a plurality of periodic payments during the life of an insured or (b) provides a single death benefit on the life of an insured, but in either case, the insured is not a beneficiary of the pension system, and wherein each insurance settlement contract meets at least one predetermined criterion;
a component configured to receive registration information that references the life insurance settlement pool and/or each insurance settlement contract in the life insurance settlement pool;
a component configured to receive an actuarial value of the life insurance settlement pool, or an actuarial value of an undivided interest held by the pension system in the life insurance settlement pool, or an actuarial value of an undivided interest held by the pension system in each of the life insurance settlement contracts in the life insurance settlement pool, on a periodic or other basis;
a component configured to calculate electronically or have calculated electronically a UAL (unfunded actuarial accrued liability) based in part on the actuarial value of the life insurance settlement pool, or the actuarial value of the undivided interest held by the pension system in the life insurance settlement pool, or the sum of the actuarial values of the undivided interests held by the pension system in the life insurance settlement contracts in the life insurance settlement pool;
a component configured to calculate electronically or have calculated electronically a UAL amortization based at least in part on the UAL; and
a component configured to communicate or have communicated a report or a network reference to the report to a third party that includes data based at least in part on the UAL amortization.

30. The system as defined in claim 29, wherein the remaining life expectancy of the insured or the remaining life expectancy of each of the insureds, when determined at least immediately after the acquisition, is such that (i) the total value of the pension system assets, inclusive of the life insurance settlement pool, determined immediately after the acquisition of the life insurance settlement pool, is greater than (ii) the total value of the pension system assets, exclusive of the life insurance settlement pool and inclusive of the one or more pension system assets used for the investment just prior to the investment, the respective total values of (i) and (ii) being determined at the same point in time and in accordance with the same actuarially sound valuation method, so that the actuarial value of the life insurance settlement pool assets will grow in value over time, thereby offsetting at least some of the fluctuations in the UAL for the pension system.

31. The system as defined in claim 29, wherein the at least one predetermined criterion is that a remaining life expectancy of the insured under the life insurance settlement contract is within a predetermined limit.

32. The system as defined in claim 31, wherein the actuarial present value is calculated using a method to increase a value of the ownership interest in each of the life settlement contracts at each calculation period as a probability of death of a respective insured associated with a respective one of the life settlement contracts increases and the death of the respective insured has not occurred.

33. A method for operating as a trustee of assets for a pension system, comprising:
generating or receiving a plurality of files or a reference or references to a plurality of files that form a life insurance settlement pool, wherein each file includes information on a life insurance settlement contract that either (a) provides a plurality of periodic payments during the life of an insured or (b) provides a single death benefit on the life of an insured, but in either case, the insured is not a beneficiary of the pension system, and wherein each file includes information on an insurance settlement contract that meets at least one predetermined criterion;
issuing payment instructions and/or payment instruments to maintain each of a plurality of the life insurance settlement contracts in the life insurance settlement pool in effect;
registering in an electronic database an ownership interest for the pension system in the life insurance settlement pool and/or in each insurance settlement contract in the life insurance settlement pool;
electronically determining or having determined electronically a proportionate share of the life insurance settlement pool based on an amount of value provided by the pension system for its investment and on total assets in the life insurance settlement pool at the time of purchase;
paying out or having paid out proceeds from the insurance policies in accordance with a predetermined priority of distribution;
electronically generating or having generated electronically an actuarial value of the life insurance settlement pool or an actuarial value for an undivided interest held by the pension system in the life insurance settlement pool, and/or an actuarial value of an undivided interest held by the pension system in each of the life insurance settlement contracts in the life insurance settlement pool on a periodic or other basis; and
communicating the actuarial value of the life insurance settlement pool or the actuarial value for the undivided interest held by the pension system in the life insurance settlement pool and/or the actuarial value of an undivided interest held by the pension system in each of the life insurance settlement contracts in the life insurance settlement pool to at least one pension system that owns an undivided interest in the life insurance settlement pool.

34. The method as defined in claim 33, wherein the communication step comprises the respective actuarial value of the respective undivided interest in the life insurance settlement pool being communicated to each of a plurality of pension systems holding respective undivided interests in the life insurance settlement pool.

35. The method as defined in claim 33, wherein the communication step comprises generating and sending a customized communication to each of a plurality of different pension systems based on the respective actuarial value of the undivided interest of the particular pension system in the life insurance settlement pool and/or in each of the life insurance settlement contracts in the life insurance settlement pool held by that pension system.

36. The method as defined in claim 33, further comprising the step of calculating or having calculated a UAL (unfunded actuarial accrued liability) amortization for at least one pension system; and generating a communication based in part on the UAL amortization to a pension system governing board.

37. The method as defined in claim 33, further comprising electronically communicating a set of predetermined criteria to an insurance settlement contract selection agent.

38. The method as defined in claim 33, further comprising:
obtaining an average weighted life expectancy for the life insurance settlement pool;
obtaining information on a comparison of the anticipated weighted average life expectancy to actual mortality data for the insureds on the life insurance settlement contracts in the life insurance settlement pool; and
communicating the information on the comparison to a program for setting a price for the undivided interest in a secondary market for the insurance settlement contract pool.

39. The method as defined in claim 33, wherein a plurality of the life insurance settlement contracts are life insurance settlement contracts that provide a single death benefit on the life of an insured.

40. The method as defined in claim 33, wherein the predetermined criterion is that the remaining life expectancy of the insured under the life insurance settlement contract is no more than 20 years.

41. The method as defined in claim 33, wherein the predetermined criterion is that the remaining life expectancy of the insured under the life insurance settlement contract is no more than 15 years.

42. The method as defined in claim 33, wherein the plurality of files are electronic files.

43. The method as defined in claim 42, further comprising
accessing a database of electronic files for life insurance settlement contracts;
electronically selecting a plurality of the life insurance settlement contracts as the life insurance settlement contracts for the life insurance settlement contract pool based on a plurality of predetermined criteria.

44. The method as defined in claim 33, wherein the at least one predetermined criterion is that a remaining life expectancy of the insured under the life insurance settlement contract is within a predetermined limit.

45. The method as defined in claim 44, wherein the actuarial present value is calculated using a method to increase a value of the ownership interest in each of the life settlement contracts at each calculation period as a probability of death of a respective insured associated with a respective one of the life settlement contracts increases and the death of the respective insured has not occurred.

46. A method comprising:
a pension system investing one or more pension system assets to obtain an undivided interest in a life insurance settlement pool that comprises a plurality of life insurance settlement contracts, wherein each insurance settlement contract either (a) provides a plurality of periodic payments during the life of an insured or (b) provides a single death benefit on the life of an insured, but in either case, the insured is not a beneficiary of the pension system, and wherein each insurance settlement contract meets at least one predetermined criterion;
receiving registration information that references the life insurance settlement pool and/or each insurance settlement contract in the life insurance settlement pool;
receiving an actuarial value of the life insurance settlement pool, or an actuarial value of an undivided interest held by the pension system in the life insurance settlement pool, or an actuarial value of an undivided interest held by the pension system in each of the life insurance settlement contracts in the life insurance settlement pool, on a periodic or other basis;
calculating electronically or having calculated electronically a UAL (unfunded actuarial accrued liability) based in part on the actuarial value of the life insurance settlement pool, or the actuarial value of the undivided interest held by the pension system in the life insurance settlement pool, or the sum of the actuarial values of the undivided interests held by the pension system in the life insurance settlement contracts in the life insurance settlement pool;
calculating electronically or having calculated electronically a UAL amortization based at least in part on the UAL; and
communicating or having communicated a report or a network reference to the report to a third party that includes data based at least in part on the UAL amortization.

47. The method as defined in claim 46, wherein the remaining life expectancy of the insured or the remaining life expectancy of each of the insureds, when determined at least immediately after the acquisition, is such that (i) the total value of the pension system assets, inclusive of the life insurance settlement pool, determined immediately after the acquisition of the life insurance settlement pool, is greater than (ii) the total value of the pension system assets, exclusive of the life insurance settlement pool and inclusive of the one or more pension system assets used for the investment just prior to the investment, the respective total values of (i) and (ii) being determined at the same point in time and in accordance with the same actuarially sound valuation method, so that the actuarial value of the life insurance settlement pool assets will grow in value over time, thereby offsetting at least some of the fluctuations in the UAL for the pension system.

48. The method as defined in claim 46, wherein the at least one predetermined criterion is that a remaining life expectancy of the insured under the life insurance settlement contract is within a predetermined limit.

49. The program product as defined in claim 48, wherein the actuarial present value is calculated using a method to increase a value of the ownership interest in each of the life settlement contracts at each calculation period as a probability of death of a respective insured associated with a respective one of the life settlement contracts increases and the death of the respective insured has not occurred.

* * * * *

UNITED STATES PATENT AND TRADEMARK OFFICE
CERTIFICATE OF CORRECTION

PATENT NO. : 7,519,552 B2  Page 1 of 1
APPLICATION NO. : 11/051473
DATED : April 14, 2009
INVENTOR(S) : Robert B. Phelps It is certified that error appears in the above-identified patent and that said Letters Patent is hereby corrected as shown below:

On the cover page,

[*] Notice:   Subject to any disclaimer, the term of this patent is extended or adjusted under 35 USC 154(b) by 685 days Delete the phrase "by 685 days" and insert -- by 1,060 days --

Signed and Sealed this

Twentieth Day of April, 2010

David J. Kappos
*Director of the United States Patent and Trademark Office*